(12) United States Patent
Nakajima (10) Patent No.: US 7,889,239 B2
(45) Date of Patent: Feb. 15, 2011

(54) IMAGING SYSTEM, IMAGING CONTROLLER, AND METHOD AND PROGRAM FOR VERTICAL SYNCHRONIZATION

(75) Inventor: Takatsugu Nakajima, Tokyo (JP)

(73) Assignee: Sony Corporation, Tokyo (JP)

( * ) Notice: Subject to any disclaimer, the term of this patent is extended or adjusted under 35 U.S.C. 154(b) by 993 days.

(21) Appl. No.: 11/436,214

(22) Filed: May 18, 2006

(65) Prior Publication Data
US 2006/0261282 A1   Nov. 23, 2006

(30) Foreign Application Priority Data
May 23, 2005   (JP)   ............... P2005-150064

(51) Int. Cl.
*H04N 5/232* (2006.01)
*H04N 5/06* (2006.01)

(52) U.S. Cl. ................... 348/211.14; 348/521
(58) Field of Classification Search ......... 348/512–514, 348/516–522, 211.99, 211.1, 211.3–211.6, 348/211.14, 151–155, 211.8, 211.11, 500, 348/525, 536
See application file for complete search history.

(56) References Cited

U.S. PATENT DOCUMENTS 5,696,553 A * 12/1997 D'Alfonso et al. ..... 348/211.14
7,456,863 B2 * 11/2008 Nakajima ............... 348/211.14

FOREIGN PATENT DOCUMENTS

| JP | 1-251881 | 10/1989 |
|---|---|---|
| JP | 6 276424 | 9/1994 |
| JP | 11-355645 | 12/1999 |
| JP | 2001-211347 | 8/2001 |

* cited by examiner

*Primary Examiner*—David L Ometz
*Assistant Examiner*—Carramah J Quiett
(74) *Attorney, Agent, or Firm*—Frommer Lawrence & Haug LLP; William S. Frommer; Thomas F. Presson (57) ABSTRACT

An imaging system having an imaging device for producing images of objects and picture signals and an imaging controller connected to the imaging device through a transmission line. The imaging device includes a vertical synchronizing signal-producing circuit to produce an internal vertical synchronizing signal for the production of images of objects. The imaging controller includes a delay-measuring circuit and a vertical-synchronization phase-advancing circuit. In the system, the imaging controller transmits a test signal to the imaging device and receives the test signal returned from the imaging device. The delay-measuring circuit measures a delay of a phase of the returned test signal relative to a phase of the transmitted test signal. The vertical-synchronization phase-advancing circuit then advances a phase of an external vertical synchronizing signal by the delay and transmits the external vertical synchronizing signal to the imaging device. The vertical synchronizing signal-producing circuit at the imaging device is reset by the phase advanced external vertical synchronizing signal transmitted from the vertical-synchronization phase-advancing circuit.

12 Claims, 10 Drawing Sheets

IMAGING SYSTEM, IMAGING CONTROLLER, AND METHOD AND PROGRAM FOR VERTICAL SYNCHRONIZATION

CROSS REFERENCES TO RELATED APPLICATIONS

The present invention contains subject matter related to Japanese Patent Application NO. 2005-150064 filed in the Japanese Patent Office on May 23, 2005, the entire contents of which being incorporated herein by reference.

BACKGROUND OF THE INVENTION

1. Field of the Invention

The present invention relates to an imaging system capable of synchronizing itself with an external vertical synchronizing signal, an imaging controller for synchronization with the external vertical synchronizing signal, and a method and a program for the vertical synchronization.

2. Description of the Related Art

An imaging device, which produces images of objects and picture signals, produces such images in accordance with an internal synchronizing signal produced by itself. When the imaging device is supposed to synchronize itself with an external device or a TV station, it has to synchronize its internal synchronizing signal with an external synchronizing signal to transmit picture signals to the apparatus or station.

For example, if two or more imaging devices are supposed to synchronize themselves with one another, each imaging device has to have a synchronizing circuit to synchronize itself with a single common external synchronizing signal. Such synchronization is achieved by synchronizing an internal synchronizing signal of each imaging device with the single common external synchronizing signal by using a PLL.

Disclosed in, for example, patent literature 1 is an art to synchronize an imaging device with an external synchronizing signal by using no PLL, but the external synchronizing signal as a reset signal for a horizontal-synchronization counter and/or a vertical-synchronization counter and using a logic circuit alone.

In the case of the invention of patent literature 1, however, if an imaging device is located at a relatively long distance from an imaging controller for relaying an external synchronizing signal to the imaging device, the imaging device is delayed in synchronization by the signal-transmission delay time of the transmission line between the controller and the device. Therefore, only transmission lines within the range of allowable delay time can be constructed. Thus, the length of transmission lines capable of making use of such function for external synchronization is limited.

Patent literature 1: Japanese Patent Unexamined Publication No. 2001-211347

SUMMARY OF THE INVENTION

In view of the above problem, there is a need for an imaging system, an imaging controller, and a method and a program for vertical synchronization which are new, improved, and capable of automatic external synchronization without phase adjustment and unlimited extension of the transmission line between the imaging system and the imaging controller.

According to an embodiment of the present invention, there is provided an imaging system from one aspect. The imaging system includes an imaging device for producing images of objects and picture signals and an imaging controller connected to the imaging device through a transmission line. The imaging device includes a circuit to produce an internal vertical synchronizing signal for the production of images of objects (hereinafter "vertical synchronizing signal-producing circuit"). The imaging controller includes a delay-measuring circuit and a vertical-synchronization phase-advancing circuit. The imaging controller transmits a test signal to the imaging device and receives the same test signal returned from the imaging device, and the delay-measuring circuit measures the delay of the phase of the returned test signal relative to the phase of the original test signal. The vertical-synchronization phase-advancing circuit advances the phase of an external vertical synchronizing signal by the delay and transmits the external vertical synchronizing signal to the imaging device. The vertical synchronizing signal-producing circuit is reset by a signal transmitted from the vertical-synchronization phase-advancing circuit.

Accordingly, even if the distance between the imaging controller and the imaging device is varied, the imaging controller achieves the external synchronization with an external vertical synchronizing signal automatically, without manual phase adjustment. Thus, no phase delay occurs and the transmission line between the imaging controller and the imaging device can be extended without limitation.

The imaging device may further include a circuit to produce an internal horizontal synchronizing signal for the production of images of objects. The imaging controller may further include a PLL (Phase-Locked Loop), which detects the phase difference between an external horizontal synchronizing signal and the above internal horizontal synchronizing signal inputted through the transmission line and transmits a signal to the imaging device to synchronize the internal horizontal synchronizing signal with the external horizontal synchronizing signal.

Accordingly, as in the case of the above external vertical synchronizing signal, even if the distance between the imaging controller and the imaging device is varied, the imaging controller achieves the external synchronization with an external horizontal synchronizing signal automatically.

According to an embodiment of the present invention, there is provided an imaging controller from another aspect. The imaging controller is connected, through a transmission line, to an imaging device for producing images of objects and picture signals. The imaging controller includes a delay-measuring circuit and a vertical-synchronization phase-advancing circuit. The imaging controller transmits a test signal to the imaging device and receives the same test signal returned from the imaging device, and the delay-measuring circuit measures the delay of the phase of the returned test signal relative to the phase of the original test signal. The phase-advancing circuit advances the phase of an external vertical synchronizing signal by the delay and transmits the external vertical synchronizing signal to the imaging device.

The delay-measuring circuit may be a counter. The counter is reset on the transmission of a test signal to the imaging device, counts up in accordance with the basic clock pulses of the imaging controller, and stops counting on the arrival of the same test signal returned from the imaging device. Besides, the difference between the period of an external vertical synchronizing signal and the delay may be found by using a down counter.

The delay-measuring circuit may set the counted value to 1 when the counted value is 0 (zero). If the counted value is 0 (zero), the vertical-synchronization phase-advancing circuit may malfunction. Such malfunction can be prevented by compulsorily setting the counted value to 1.

The vertical-synchronization phase-advancing circuit may be a delaying circuit to delay the phase of an external vertical synchronizing signal by the difference between the period of the external vertical synchronizing signal and the delay due to the transmission line.

Although it is desirable to advance the phase of an external vertical synchronizing signal by the delay due to the transmission line between an imaging device and a imaging controller, such phase advancement can be achieved by delaying the phase of an external vertical synchronizing signal by the difference between the period of the external vertical synchronizing signal and the delay due to the transmission line.

The imaging controller may further include a delay-latching circuit, which latches the previously measured delay while the delay-measuring circuit does not measure the delay.

With the above configuration, the vertical-synchronization phase-advancing circuit can reliably get the result of measurement (delay) by the delay-measuring circuit without being concerned about the difference between the timing of the delay-measuring circuit and the timing of the vertical-synchronization phase-advancing circuit.

A signal outputted from the vertical-synchronization phase-advancing circuit may reset the vertical synchronizing signal-producing circuit of the above imaging device. An external vertical synchronizing signal and an internal vertical synchronizing signal are synchronized by resetting the vertical synchronizing signal-producing circuit.

The above test signal may be the above external vertical synchronizing signal. Although it is possible to provide a test signal separately, such an external vertical synchronizing signal to be automatically adjusted may be used for the phase adjustment.

The imaging controller may further include a PLL (Phase-Locked Loop), which detects the phase difference between an external horizontal synchronizing signal and an internal horizontal synchronizing signal transmitted from the imaging device to the imaging controller through the transmission line and transmits a signal to the imaging device to synchronize the internal horizontal synchronizing signal inputted through the transmission line with the external horizontal synchronizing signal.

According to an embodiment of the present invention, there is provided a method of vertical synchronization from still another aspect. The method of vertical synchronization includes the steps of (i) transmitting a test signal to an external device, (ii) measuring the delay of the phase of the test signal returned from the external device relative to the phase of the original test signal, and (iii) advancing the phase of an external vertical synchronizing signal by the delay and transmits the external vertical synchronizing signal to the external device. Besides, a program for a computer to execute the method of vertical synchronization is provided.

As described above, according to an embodiment of the present invention, even if the distance between the imaging controller and the imaging device is varied, the imaging controller achieves the external synchronization with an external vertical synchronizing signal automatically, without manual phase adjustment. Thus, no phase delay occurs and the transmission line between the imaging controller and the imaging device can be extended without limitation.

DESCRIPTION OF THE PREFERRED EMBODIMENTS

By referring to the attached drawings, preferred embodiments of the present invention will be described bellow. In this specification and the attached drawings, the same reference numerals and signs are assigned to substantially the same components and devices in order to avoid the repetition of the same description.

First Embodiment

Imaging System

Figure 1:
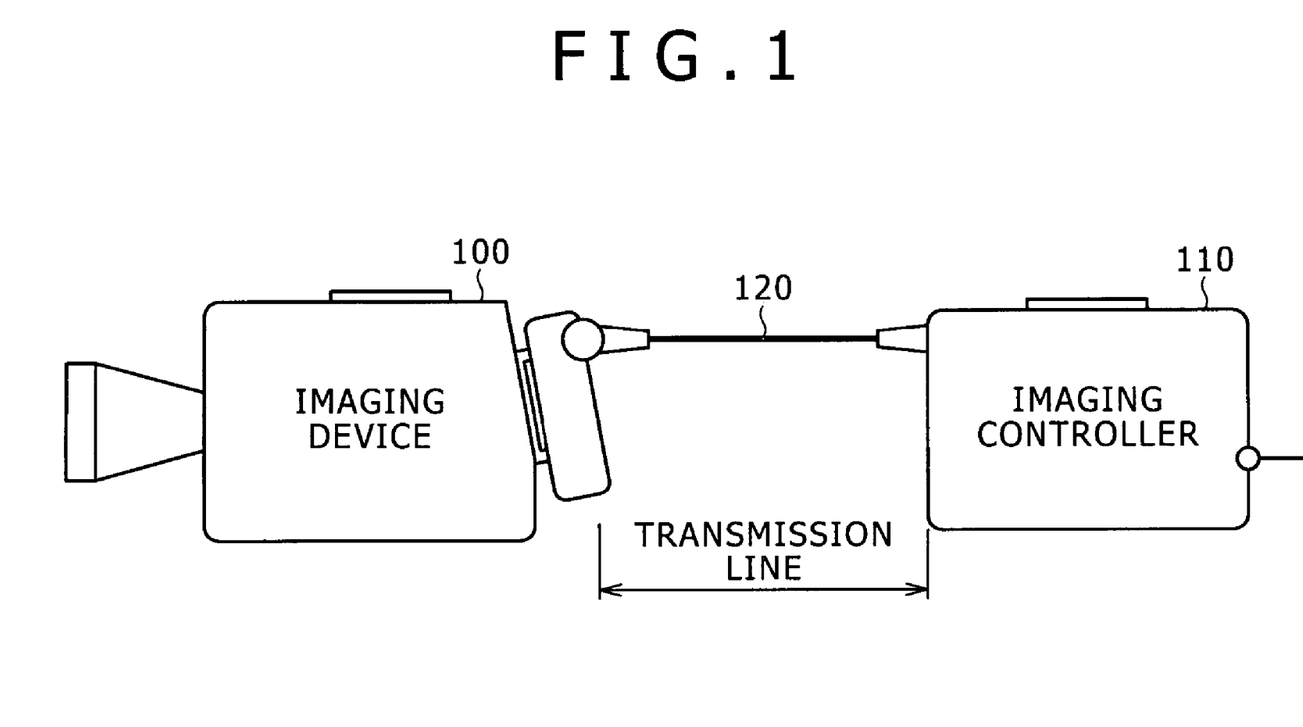
FIG. 1 is a schematic block diagram of an imaging system according to a first embodiment of the present invention.

FIG. 1 is a schematic block diagram of an imaging system according to a first embodiment of the present invention. The imaging system includes an imaging device 100, an imaging controller 110, and a transmission cable 120 connecting the device and the controller.

If the imaging device 100 is alone in producing images of objects, an internal synchronizing signal produced by the imaging device 100 is referred to. The internal synchronizing signal includes an internal horizontal synchronizing signal for the synchronization of horizontal signals of pictures and an internal vertical synchronizing signal for the synchronization of vertical signals of pictures.

If the imaging device 100 produces images of objects in synchronization with an external installation such as a TV station, the imaging device 100 has to transmit picture signals in accordance with an external synchronizing signal used by the external installation. Namely, the internal synchronizing signal of the imaging device 100 has to be synchronized with the external synchronizing signal. Such external synchronization can be achieved by a PLL provided in the imaging device 100 if the phase delay due to the transmission cable 120 is negligible.

On the other hand, long-distance transmission between an imaging device 100 and an imaging controller 110 has become possible by using an optical fiber cable as the transmission cable 120. However, the longer the distance of transmission of picture signals is, the longer the delay time in the transmission becomes. Therefore, only transmission lines within the range of allowable delay time can be constructed. Thus, the length of transmission lines capable of making use of such function for external synchronization is limited.

Figure 2:
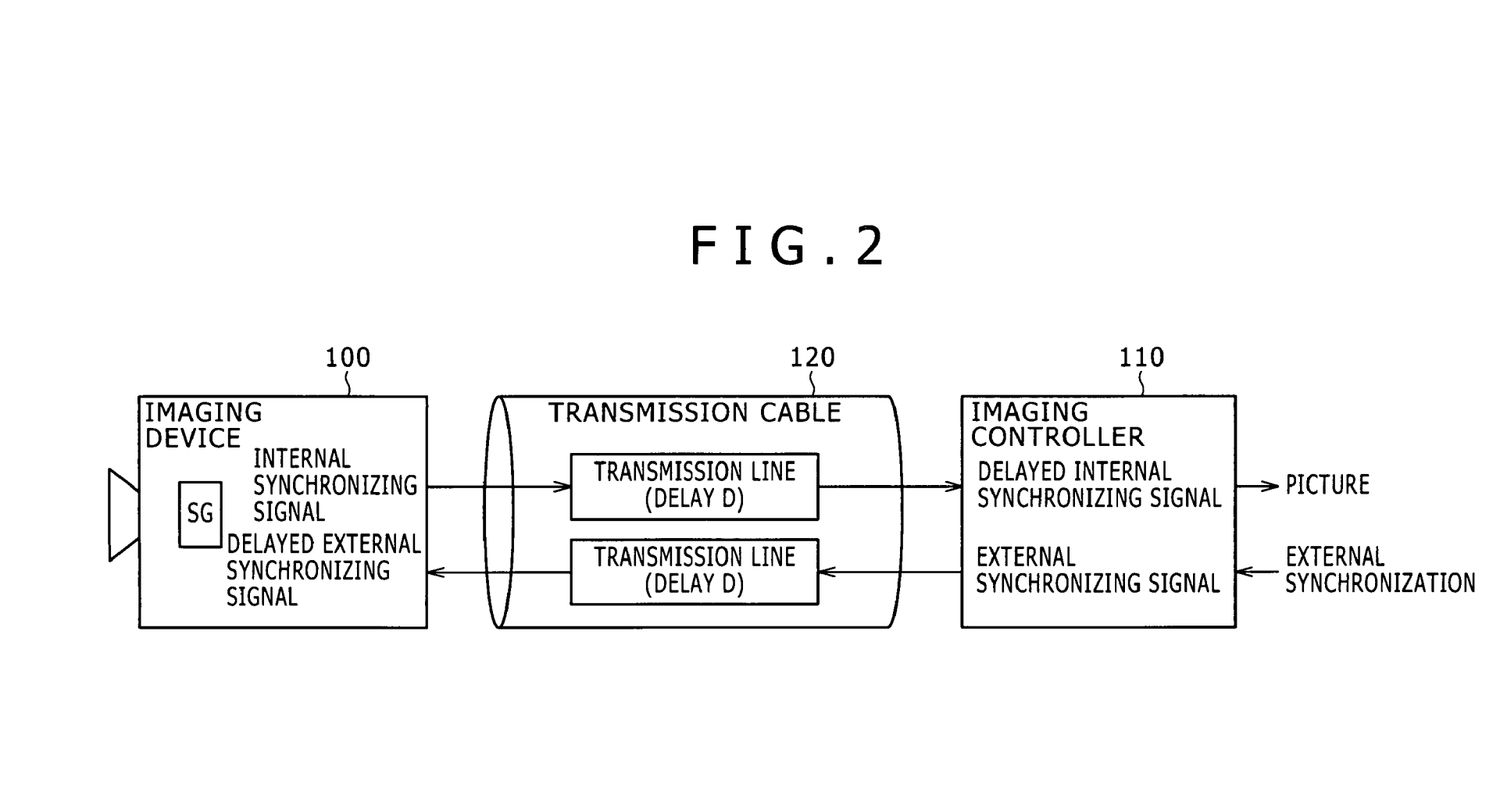
FIG. 2 is an illustration to explain the delay due to a transmission line.

FIG. 2 is an illustration to explain the delay due to such a transmission line. The imaging device 100 and the imaging controller 110 are connected by a transmission cable 120 which is an optical fiber cable capable of full-duplex transmission.

If external synchronization is to be achieved just by using an external synchronizing signal inputted into the imaging device 100, delay in signal transmission occurs in proportion to the distance of the transmission cable 120. Thus, a phase shift of picture signals occurs. To be specific, a delay time D occurs in the transmission of an external synchronizing signal from the imaging controller 110 to the imaging device 100 and another delay time D occurs in the transmission of an internal synchronizing signal from the imaging device 100 to the imaging controller 110. Therefore, the phase difference between the external and internal synchronizing signals is 2D at the imaging controller 110.

Delay as to the vertical synchronizing signal and delay as to the horizontal synchronizing signal will be described in detail below.

Figure 3:
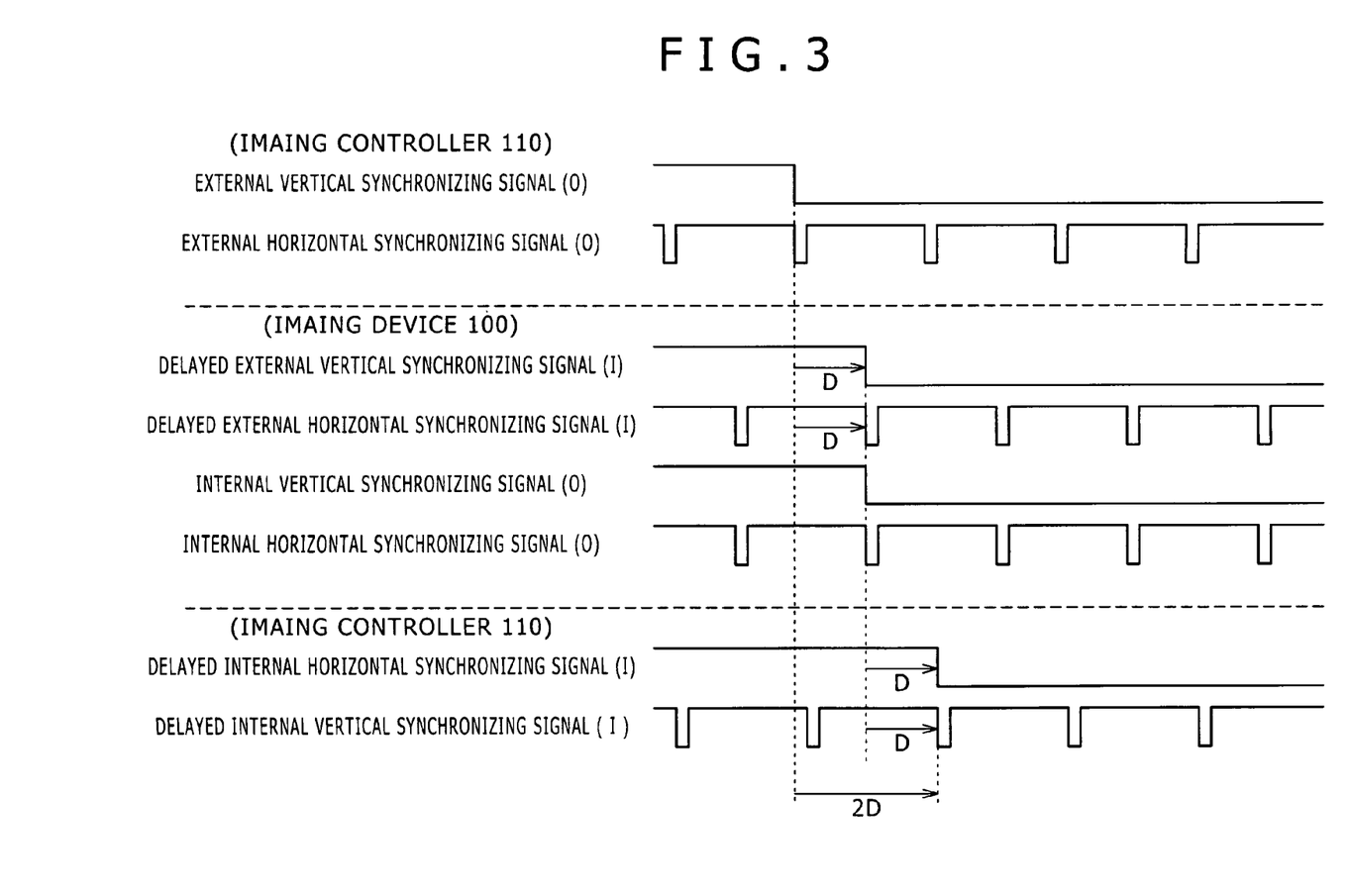
FIG. 3 is a time chart to illustrate the delay times as to the vertical and horizontal synchronizing signals.

FIG. 3 is a time chart to illustrate the delay times as to the vertical and horizontal synchronizing signals. The signs "I" and "O" in FIG. 3 stand for "input" and "output," respectively. The same signs are used in the time charts to be described later. "External vertical synchronizing signal (O)" and "external horizontal synchronizing signal (O)" shown in the top section of FIG. 3 are the signals inputted from an external installation into the imaging controller 110. "Delayed external vertical synchronizing signal (I)" and "delayed external horizontal synchronizing signal (I)" shown in the middle section of FIG. 3 are the signals received by the imaging device 100. They are delayed by D.

The imaging device 100 produces "internal vertical synchronizing signal (O)" and "internal horizontal synchronizing signal (O)" shown in the middle section of FIG. 3 which are synchronized with the delayed external vertical and horizontal synchronizing signals (I) by a PLL or by resetting a counter. The imaging device 100 produces images of objects by referring to the internal vertical and horizontal synchronizing signals.

Then, the imaging device 100 transmits the internal vertical and horizontal synchronizing signals (O) to the imaging controller 110. "Delayed internal vertical synchronizing signal (I)" and "delayed internal horizontal synchronizing signal (I)" shown in the bottom section of FIG. 3 are the signals received by the imaging controller 110. They are delayed by D. Thus, the phase delay between the external synchronizing signal and the internal synchronizing signal is 2D at the imaging controller 110.

Second Embodiment

Vertical Synchronizing Signal

In the external synchronization mode of a conventional imaging device 100, an external vertical synchronizing signal from an imaging controller 110 resets the vertical synchronizing signal-producing circuit in the imaging device 100 to synchronize an internal vertical synchronizing signal with the external vertical synchronizing signal. However, if the transmission cable 120 such as an optical fiber cable between the imaging device 100 and the imaging controller 110 is laid over a long distance, external synchronization cannot be achieved at the imaging controller 110. This problem can be solved as follows.

The above problem is solved in two steps. The first step is to provide a circuit to measure the round-trip delay due to the transmission cable 120. The second step is to provide a circuit to advance the phase of a vertical-synchronization reset signal (hereinafter "phase-advanced external vertical synchronizing signal") separated from an external synchronizing signal by the delay measured in the first step. Namely, a phase-advanced external vertical synchronizing signal, whose phase is already advanced by the delay, is transmitted to the vertical synchronizing signal-producing circuit of the imaging device 100.

Figure 4:
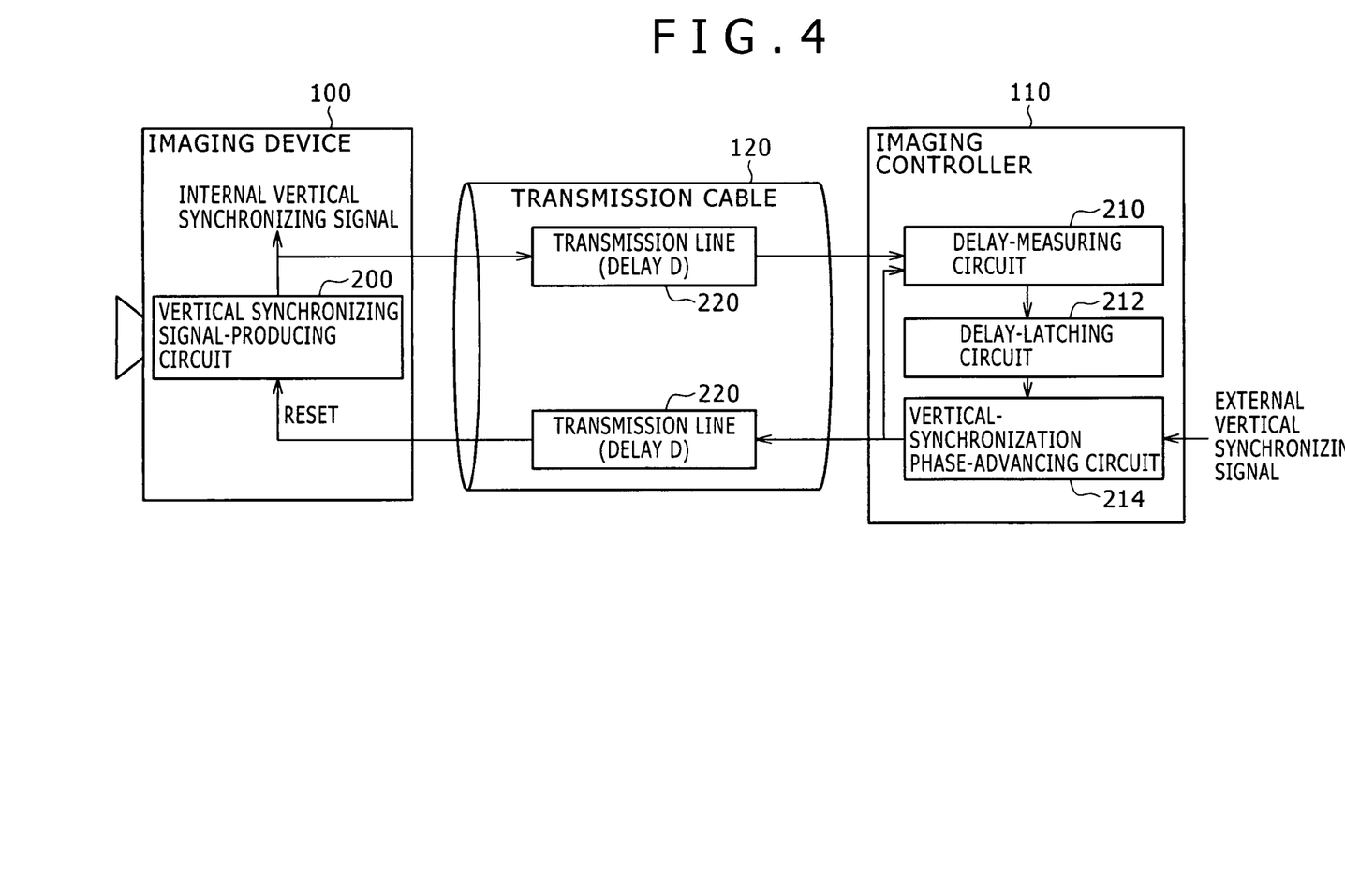
FIG. 4 is a schematic block diagram of an imaging system according to a second embodiment of the present invention.

FIG. 4 is a schematic block diagram of an imaging system according to the second embodiment of the present invention. The object of the imaging system is the external synchronization with an external synchronizing signal for vertical signals. In this imaging system, the imaging device 100 has a vertical synchronizing signal-producing circuit 200. The imaging controller 110 has a delay-measuring circuit 210, a delay-latching circuit 212, and a vertical-synchronization phase-advancing circuit 214. The imaging device 100 and the imaging controller 110 are connected by transmission lines 220 and 220.

The vertical synchronizing signal-producing circuit 200 produces an internal vertical synchronizing signal to be used by the imaging device 100 to produce images of objects. The vertical synchronizing signal-producing circuit 200 usually counts the output of a horizontal synchronizing signal-producing circuit to be described later as clock input and outputs an internal vertical synchronizing signal at intervals of a prescribed value. In the external-synchronization mode, this counter is reset by an external vertical synchronizing signal.

The delay-measuring circuit 210 measures the delay 2D between the phase of a test signal transmitted from any circuit (the vertical-synchronization phase-advancing circuit 214 in FIG. 4) to the imaging device 100 and the phase of the same test signal returned from the imaging device 100 through the transmission line 220. The delay-measuring circuit 210 may be a counter which counts the delay 2D in accordance with an appropriate clock.

The delay-latching circuit 212 latches the delay measured by the delay-measuring circuit 210. The delay-latching circuit 212 may be made of a flip-flop circuit or the like. The delay-latching circuit 212 latches the previously measured delay while the delay-measuring circuit 210 does not measure the delay.

The vertical-synchronization phase-advancing circuit 214 advances the phase of an external vertical synchronizing signal by the delay 2D measured by the delay-measuring circuit 210 and transmits the external vertical synchronizing signal to the imaging device 100. The phase advancement may be achieved by a delaying circuit to delay the phase of an external vertical synchronizing signal by the difference between the period of the external vertical synchronizing signal and the delay 2D.

According to the second embodiment of the present invention, the delay 2D is first measured by the delay-measuring circuit 210 and then the phase of an external vertical synchronizing signal inputted from an external installation is advanced by the delay 2D and outputted. The phase-advanced external vertical synchronizing signal thus outputted is returned as an internal vertical synchronizing signal from the imaging device 100 to the imaging controller 110 to become a delayed internal vertical synchronizing signal at the imaging controller 110. The delayed internal vertical synchronizing signal is synchronized precisely with the external vertical synchronizing signal. The workings of the vertical-synchronization phase-advancing circuit 214 will be detailed below.

Figure 5:
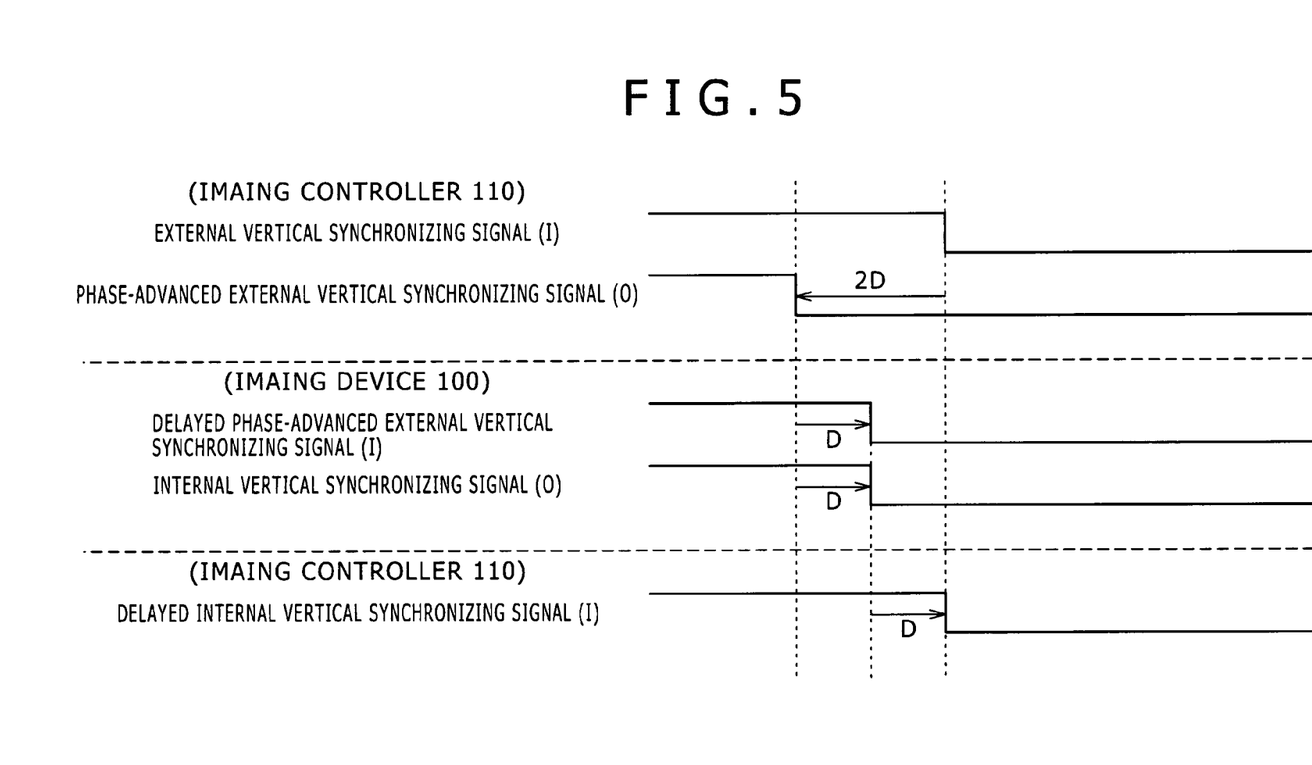
FIG. 5 is a time chart to illustrate the delay as to the vertical synchronizing signal.

FIG. 5 is a time chart to illustrate the delay as to the vertical synchronizing signal. First, an external vertical synchronizing signal is inputted from an external installation into the imaging controller 110. The phase of the external vertical synchronizing signal is advanced by 2D by the vertical-synchronization phase-advancing circuit 214, the external vertical synchronizing signal becoming a phase-advanced external vertical synchronizing signal, as shown in the top section of FIG. 5.

The phase-advanced external vertical synchronizing signal is transmitted through the transmission cable 120 to the imaging device 100. The imaging device 100 receives the delayed phase-advanced external vertical synchronizing signal whose phase has been delayed by D relative to the phase of the phase-advanced external vertical synchronizing signal as shown in the middle section of FIG. 5. Then, the delayed phase-advanced external vertical synchronizing signal resets the vertical synchronizing signal-producing circuit 200. Therefore, the internal vertical synchronizing signal produced by the vertical synchronizing signal-producing circuit 200 is synchronized with the delayed phase-advanced external vertical synchronizing signal as shown in the middle section of FIG. 5.

Then, the imaging device 100 transmits the internal vertical synchronizing signal to the imaging controller 110. The delayed internal vertical synchronizing signal shown in the bottom section of FIG. 5 is the internal vertical synchronizing signal received by the imaging controller 110 through the transmission cable 120. Another delay of D occurred between the imaging device 100 and the imaging controller 110, making the round-trip delay 2D. However, because the phase of the phase-advanced external vertical synchronizing signal from the vertical-synchronization phase-advancing circuit 214 is advanced by 2D, the delayed internal vertical synchronizing signal is synchronized with the external vertical synchronizing signal.

Thus, even if the distance between the imaging controller 110 and the imaging device 100 is varied, the imaging controller 110 achieves the external synchronization with an external vertical synchronizing signal automatically, without manual phase adjustment. Thus, no phase delay occurs and the transmission line between the imaging controller 110 and the imaging device 100 can be extended without limitation.

Third Embodiment

Horizontal Synchronizing Signal

Next, the horizontal synchronizing signal will be described below.

Figure 6:
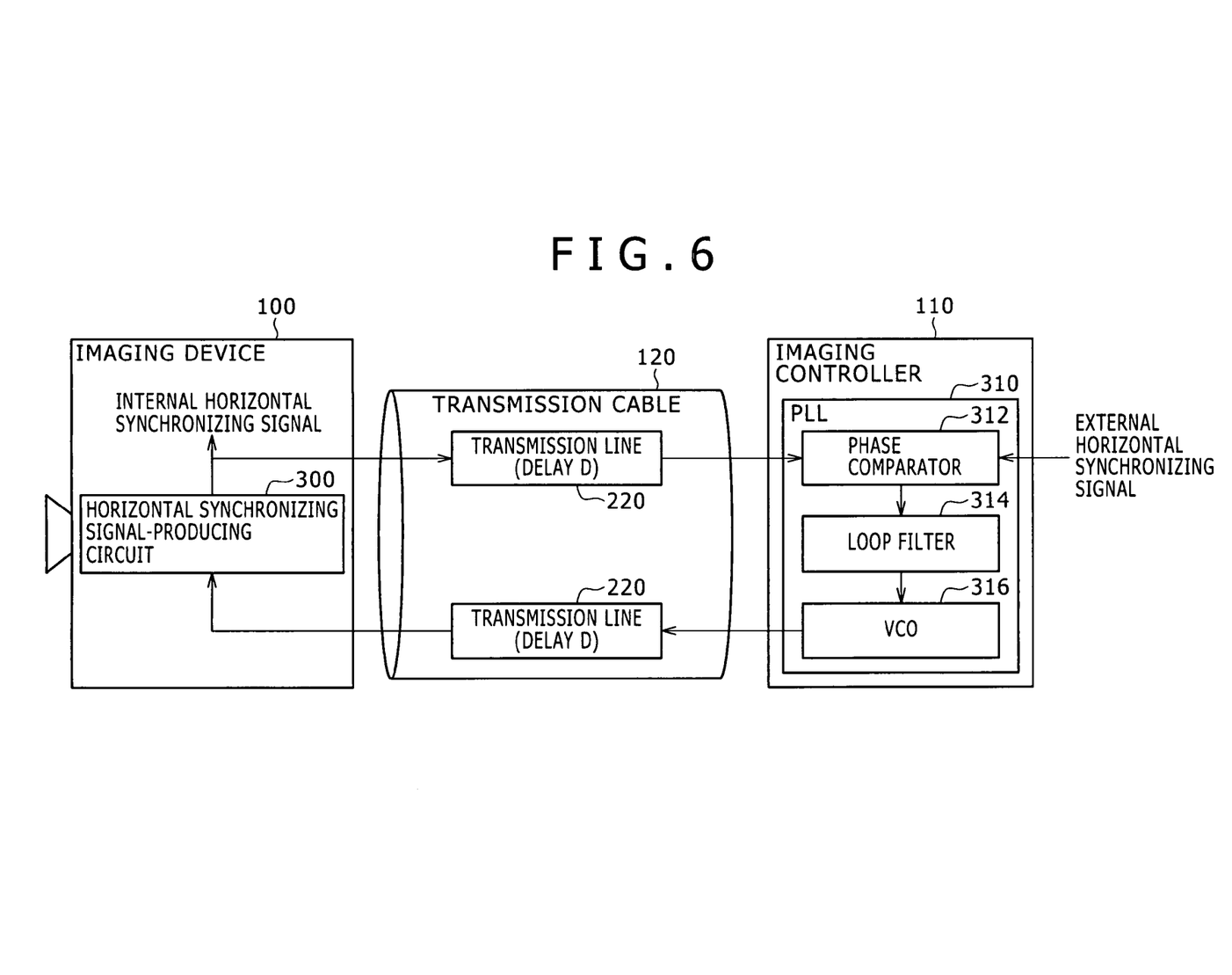
FIG. 6 is a schematic block diagram of an imaging system according to a third embodiment of the present invention.

FIG. 6 is a schematic block diagram of an imaging system according to the third embodiment of the present invention. The object of the imaging system is the external synchronization with an external synchronizing signal for horizontal signals. In the imaging system, the imaging device 100 has a horizontal synchronizing signal-producing circuit 300. The imaging controller 110 has a PLL 310.

The horizontal synchronizing signal-producing circuit 300 produces an internal horizontal synchronizing signal to be used by the imaging device 100 to produce images of objects.

The PLL 310 includes a phase comparator 312, a loop filter 314, and a VCO (Voltage Controlled Oscillator) 316. The PLL 310 detects the phase difference between an external horizontal synchronizing signal and the internal horizontal synchronizing signal transmitted from the imaging device 100 through the transmission cable 120 and transmits a signal to the imaging device 100 so as to synchronize the external horizontal synchronizing signal with the internal horizontal synchronizing signal transmitted through the transmission line.

The phase comparator 312 detects the phase difference between two inputted signals, namely, the external and internal horizontal synchronizing signals and outputs the phase difference in the form of voltage.

The loop filter 314 filters the voltage value of the phase difference, detected by the phase comparator 312, with the loop time constant of the PLL 310.

The VCO 316 adjusts the frequency of the clock signal and outputs the adjusted clock signal so as to synchronize the internal horizontal synchronizing signal with the external horizontal synchronizing signal. If the phase of the delayed internal horizontal synchronizing signal received by the imaging controller 110 is behind the phase of the external horizontal synchronizing signal, the VCO 316 increases the frequency of the clock signal. If the phase of the delayed internal horizontal synchronizing signal received by the imaging controller 110 is in advance of the phase of the external horizontal synchronizing signal, the VCO 316 decreases the frequency of the clock signal.

Thus, outputted from the PLL 310 is a clock signal whose frequency is adjusted so as to synchronize the internal horizontal synchronizing signal with the external horizontal synchronizing signal. The horizontal synchronizing signal-producing circuit 300 of the imaging device 100 refers to the clock signal and produces an internal horizontal synchronizing signal, which becomes a delayed internal horizontal synchronizing signal at the imaging controller 110. The delayed internal horizontal synchronizing signal is precisely synchronized with the external horizontal synchronizing signal.

Thus, with the construction of the above PLL 310, like the case of the above external vertical synchronizing signal, regardless of the length of the transmission cable 120 between the imaging device 100 and the imaging controller 110, the external synchronization with an external horizontal synchronizing signal at the imaging controller 110 is achieved automatically. As to the details of the above vertical synchronization, Japanese Patent Unexamined Publication No. 2004-5736 of the same applicant as the present invention is also referred to.

Although the vertical and horizontal synchronizing signals are described as the second and third embodiment respectively, separately for easy understanding, both the vertical- and horizontal-synchronization devices are usually provided simultaneously and they operate independently or in relation to each other.

The phase difference or delay between the vertical and horizontal synchronizing signals poses another problem. If a horizontal-synchronization device is provided and no vertical-synchronization device is provided, external synchronization is disturbed when the length of the transmission line (optical fiber cable?) goes beyond a certain value.

In short, the horizontal synchronization and vertical synchronization of produced picture signals have to be in prescribed phase relations. Considered below are the problems when the phase of a horizontal synchronizing signal alone is automatically adjusted and the phase of a vertical synchronizing signal is delayed.

As a general rule, the phase relation between horizontal and vertical synchronizing signals determines the next field in a system of 2:1 interlace; therefore, the phase difference between horizontal and vertical synchronizing signals should not exceed one half of the period of the horizontal synchronizing signal. In the progressive system also, the phase difference between horizontal and vertical synchronizing signals should not exceed the period of the horizontal synchronizing signal.

More specifically, in the system of 2:1 interlace, there are a case where an internal vertical synchronizing signal is reset by the period of fields and a case where an internal vertical synchronizing signal is reset by the period of frames. In the former case, as the next field is determined by the phase relation between horizontal and vertical synchronizing signals, the field of external synchronization and the field of outputted pictures are reversed if the vertical synchronizing signal is delayed by more than one half of the period of the horizontal synchronizing signal. In the latter case, although fields are not reversed, the start of the frame gets untimely if the vertical synchronizing signal is delayed by more than the period of the horizontal synchronizing signal.

As described earlier by referring to FIG. 3, the round-trip delay of a vertical synchronizing signal due to a transmission cable between an imaging device and an imaging controller is 2D. In a system of 2:1 interlace, as the round-trip delay of a vertical synchronizing signal of up to a quarter of the period of a horizontal synchronizing signal is allowed, the one-way delay of a vertical synchronizing signal of up to an eighth of the period of a horizontal synchronizing signal is allowed.

Accordingly, in an NTSC system using a horizontal synchronizing signal whose period is 63.5556 usec, the maximum allowable length of the transmission cable is about 1,600 m ($\approx$63.5/8 usec/5 nsec/m). If an ordinary multimode optical fiber cable is used as an optical fiber cable, its maximum possible transmission distance is shorter than the above maximum allowable length, posing no problem. If an ordinary single-mode optical fiber cable is used, its maximum possible transmission distance is longer than the above maximum allowable length, posing a problem. In the case of a high-definition system of the 1,080/59.94i system, the period of the horizontal synchronizing signal is 29.6 usec; therefore, the maximum allowable length of the transmission cable 120 is 740 m.

With the imaging controller 110 according to the embodiment described above, external synchronization as to both vertical and horizontal signals can be achieved. Although each signal is timed independently of the other, no delay as large as a quarter of the period of the horizontal synchronizing signal occurs. Therefore, external synchronization can be achieved even in the case of remote imaging devices (such as remote cameras) where transmission over a longer distance through a single-mode optical fiber cable is supposed to take place.

A PLL is used for external synchronization with an external horizontal synchronizing signal in the third embodiment, whereas a phase-advancing circuit is used for external synchronization with an external vertical synchronizing signal in the second embodiment. Although such external synchronization with an external vertical synchronizing signal can be achieved by using a PLL, the approach is not practical because the phase-comparing time of the external vertical synchronizing signal is long compared with that of an external horizontal synchronizing signal and adjustment for synchronization is made only once during that long time.

Fourth Embodiment

Details of Vertical Synchronizing Signal

The second embodiment of the present invention is for external synchronization with an external vertical synchronizing signal. Now, a circuit for the external synchronization and how to advance the phase of an external vertical synchronizing signal will be described in detail below.

Figure 7:
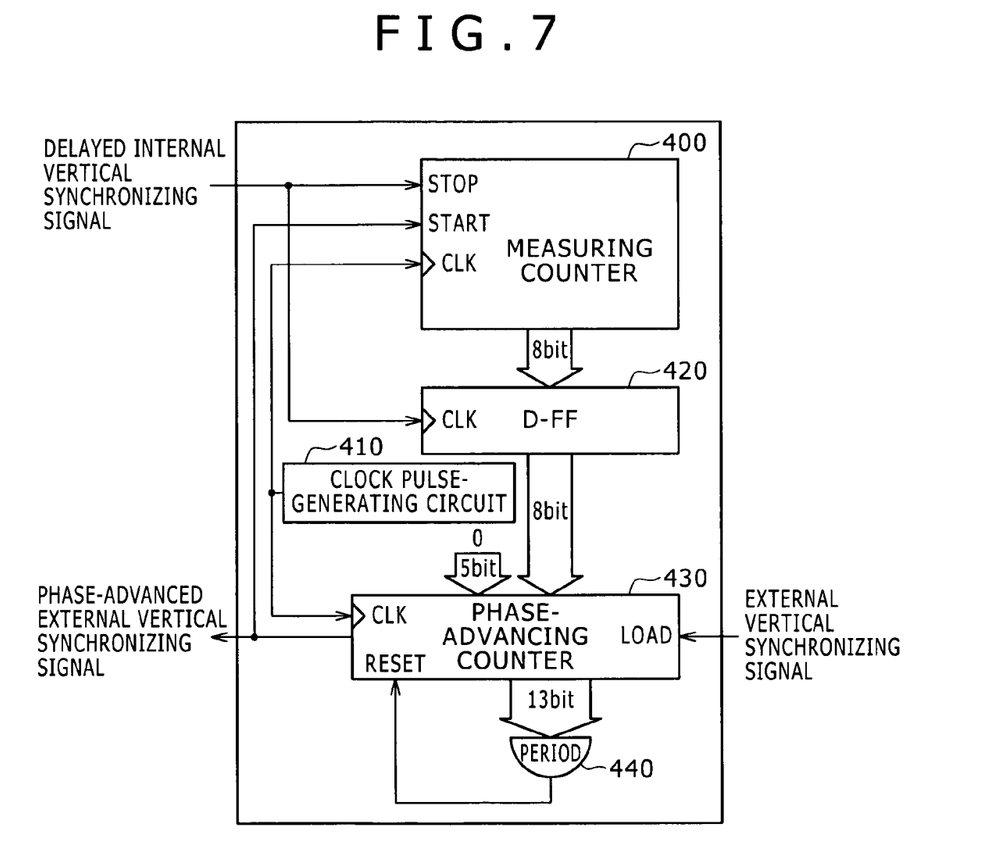
FIG. 7 shows a circuit for external synchronization with an external vertical synchronizing signal.

FIG. 7 shows the circuit for external synchronization with an external vertical synchronizing signal. The external synchronization is achieved by a delay-measuring circuit 210, a delay-latching circuit 212, and a vertical-synchronization phase-advancing circuit 214 in the imaging controller 110.

A measuring counter 400 is provided to serve as the delay-measuring circuit 210. The measuring counter 400 here is of eight-bit construction, but it may be of the construction of any number of bits.

A test signal outputted from the imaging controller 110, or phase-advanced external vertical synchronizing signal, is inputted into the measuring counter 400 through a count-START terminal as shown in FIG. 7. The test signal returned from the imaging device 100, or delayed internal vertical synchronizing signal, is inputted into the measuring counter 400 through a count-STOP terminal as shown in FIG. 7. Basic clock pulses from a clock pulse-generating circuit 410 are inputted into the measuring counter 400, too.

Figure 8:
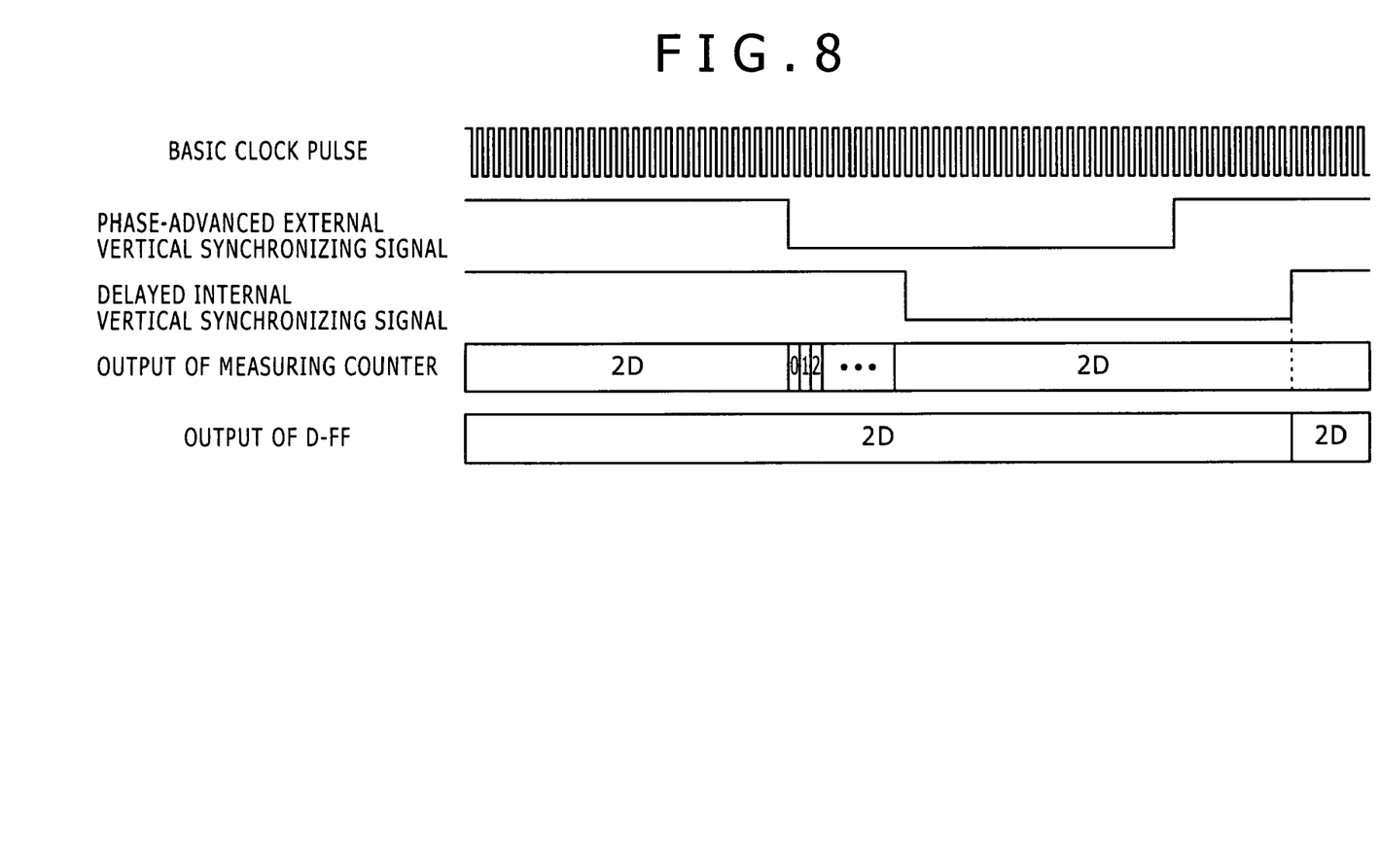
FIG. 8 is a time chart to illustrate the workings of a measuring counter.

FIG. 8 is a time chart to illustrate the workings of the measuring counter 400. Clock pulses, whose period is six times the period of a horizontal synchronizing signal, namely, 202.3 kHz in the case of 1,080/59.94i and 168.75 kHz in the case of 1,080/50i, are inputted into the measuring counter 400 as basic clock pulses. Clock pulses of higher frequency may be inputted into the measuring counter 400.

The measuring counter 400 resets and starts the count upon the fall of the phase-advanced external vertical synchronizing signal. As shown in FIG. 8, the count is made from zero with the increment of 1.0. The count is stopped upon the fall of the delayed internal vertical synchronizing signal from the imaging device 100. Therefore, the measuring counter 400 counts 2D. The measuring counter 400 retains the counted value 2D until the next fall of the phase-advanced external vertical synchronizing signal.

In this way, the measuring counter 400 serving as the delay-measuring circuit 210 detects the delay 2D between a test signal transmitted from the imaging controller 110 to the imaging device 100 through the transmission line and the test signal returned from the imaging device 100 to the imaging controller 110 through the transmission line.

The measuring counter 400 may count the delay 2D once or several times during the initialization after the power supply of the imaging system is turned on or periodically after the power supply of the imaging system is turned on. If measuring counter 400 counts the delay once or several times during the initialization, it will do if a D-FF 420 to be described later latches once and the latched values are retained until the power supply of the imaging system is turned off. If the measuring counter 400 counts the delay periodically after the power supply of the imaging system is turned on, it is possible to cope with the changes of the external vertical synchronizing signal.

If the delay due to the transmission cable 120 is longer than the period of the external vertical synchronizing signal, the delay cannot be measured. Therefore, it is necessary to prepare a measuring counter 400 capable of counting a time longer than the expected delay 2D of the transmission cable 120. If the vertical synchronizing signal of video is to be measured, the maximum measurable round-trip delay is about 16 msec (one-way delay is about 8 msec) in the case of an NTSC system, which is converted into the length 1,600 km ($\approx$8 usec/5 nsec/m) of the transmission cable 120. Therefore, the maximum measurable round-trip delay of about 16 msec is practical enough.

The period of basic clock pulses to cause the measuring counter 400 to operate gives rise to errors in the measured values, but such errors are within the range of allowable errors. By reducing the frequency of basic clock pulses, therefore, the number of bits of the measuring counter 400 can be reduced or the range of measurement can be expanded. Thus, the frequency of basic clock pulses can be chosen in accordance with the requirements of the imaging system.

Although it will do if the precision in the measurement of delay is better than a half of the period 29.659 usec of an horizontal synchronizing signal, or 14.8 usec, in the case of 1,080/59.94i, a precision of ±2.5 usec is aimed at. Because the delay-measuring circuit 210 operates in accordance with the above basic clock pulses, the length of the transmission cable 120 can be measured substantially with a precision of about 500 m.

The measuring counter 400 may be so set up that the counted value is set to 1 when the counted value of delay becomes zero. When the counted value is zero, the vertical-synchronization phase-advancing circuit 214 at the subsequent stage may malfunction. Thus, such malfunction can be prevented by compulsorily setting the counted value to 1.

A D-FF (Delay Flip-Flop) 420 is provided to serve as the delay-latching circuit 212. It will do if the number of bits of the D-FF 420 is equal to or more than the number of bits of output (eight bits) of the measuring counter 400.

The D-FF 420 latches the previously measured value while the measuring counter 400 does not measure the delay. As shown in FIG. 8, the rise of the delayed internal vertical synchronizing signal is made use of.

Thus, without being concerned about the difference between the timing of the measuring counter 400 and the timing of the phase-advancing counter 430 to be described later, the phase-advancing counter 430 can get the measured value (delay of 2D) of the measuring counter 400 reliably.

A phase-advancing counter 430 is provided to serve as the vertical-synchronization phase-advancing circuit 214. The phase-advancing counter 430 is of construction of 13 bits here, but may be of construction of any number of bits.

The phase-advancing counter 430 advances the phase of an external vertical synchronizing signal inputted from an external installation by the delay of 2D measured by the measuring counter 400 and transmits the phase-advanced external vertical synchronizing signal to the imaging device 100. The phase advancement is achieved here by a delaying circuit to delay the phase of an external vertical synchronizing signal by the difference between the period of the external vertical synchronizing signal and the delay 2D.

An external vertical synchronizing signal is inputted into the phase-advancing counter 430 through a LOAD terminal as shown in FIG. 7, and the delay 2D latched by the D-FF 420 is taken in as the initial value by the LOAD signal. In this regard, the problem of being different in the number of bits from that of the D-FF 420 is solved by taking zero in all the five high order bits. Further, as in the case of the measuring counter 400, basic clock pulses from the clock pulse-generating circuit 410 are inputted as counter clock pulses, too.

Figure 9:
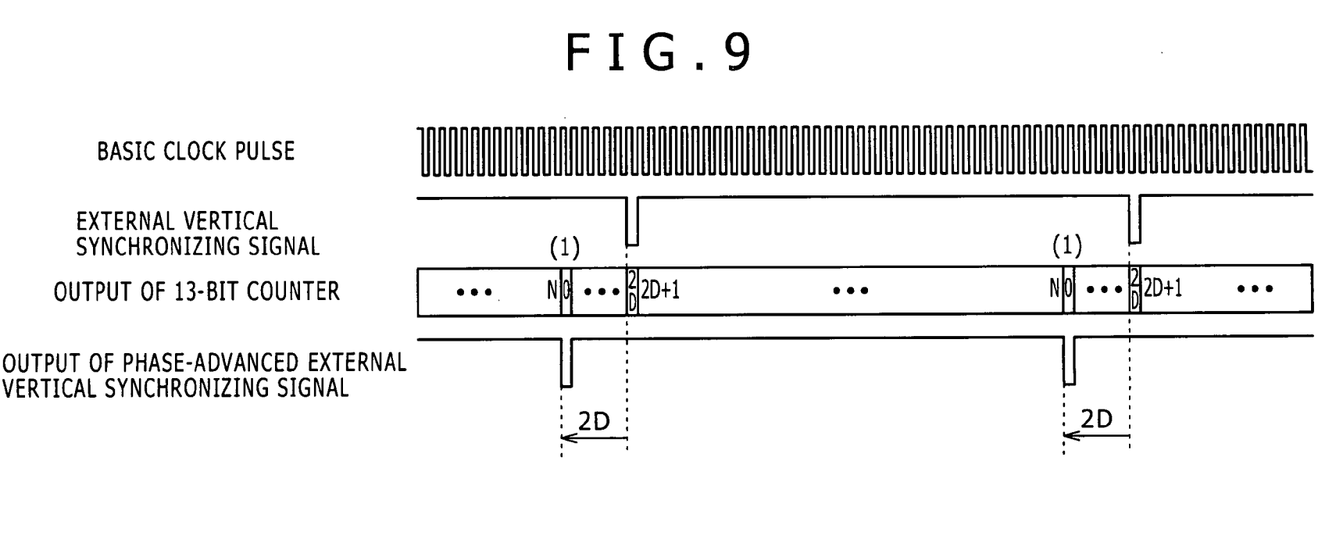
FIG. 9 is a time chart to illustrate the workings of a phase-advancing counter.

FIG. 9 is a time chart to illustrate the workings of the phase-advancing counter 430. Clock pulses, whose period is six times the period of a horizontal synchronizing signal, namely, 202.3 kHz in the case of 1,080/59.94i and 168.75 kHz in the case of 1,080/50i, are inputted as basic clock pulses.

The phase-advancing counter 430 is reset by a period OR 440 for counting a period of an external vertical synchronizing signal. Namely, when the output of the phase-advancing counter 430 reaches a prescribed value, that is, 6,750 (6×1, 125 (the period of a horizontal synchronizing signal)), the period OR 440 becomes active and resets the counted value to zero. The counted value compared with the output of the phase-advancing counter 430 by the period OR 440 is a period of an external vertical synchronizing signal which is set in advance or set according to the change in the period of the basic clock pulse or the external vertical synchronizing signal by the imaging controller 110.

The counted value of the phase-advancing counter 430 reset by the period OR 440 becomes zero at the point of (1) in FIG. 9, and the count is made from zero with the increment of 1.

Then, the delay 2D latched by the D-FF 420 according to the fall of the external vertical synchronizing signal is taken in. Thus, as a counted value of the phase-advancing counter 430, regardless of the value so far counted, the delay 2D is compulsorily loaded.

After the delay 2D being taken in, the count is further made from that numerical value to a prescribed counted value corresponding to the period of the external vertical synchronizing signal. Then, when the prescribed counted value is reached, a reset pulse is again outputted from the period OR 440. Such a reset pulse is also outputted to the imaging device 100 as a phase-advanced external vertical synchronizing signal.

Thus, relative to the external vertical synchronizing signal, the phase-advanced external vertical synchronizing signal is delayed by the difference between the period of the external vertical synchronizing signal and the delay 2D. From another viewpoint, it is understood that the phase of the phase-advanced external vertical synchronizing signal is advanced relative to the phase of the external vertical synchronizing signal by the delay 2D. To be precise, the phase-advanced external vertical synchronizing signal is not made by advancing the phase of the current external vertical synchronizing signal but is made by delaying the phase of the past external vertical synchronizing signal. However, it does not pose a problem since the external vertical synchronizing signal is usually repeated at a constant period.

Further, by not allowing the counted value of the above measuring counter 400 to be zero, malfunction of the counted value before and after the set timing can be avoided.

Thus, the phase-advancing counter 430 serving as the vertical synchronization phase-advancing circuit 214 can advance a phase of an external vertical synchronizing signal by the delay measured by the measuring counter 400 and transmit the external vertical synchronizing signal to the imaging device 100.

With the above imaging system, regardless of the length of the transmission line between the imaging device 100 and the imaging controller 110, the external synchronization with an external synchronizing signal at the imaging controller 110 is achieved automatically without manual phase adjustment. Accordingly, phase adjustment of the external synchronization becomes unnecessary, and a problem of adjustment's being forgotten or adjustment errors can be avoided when installing an imaging device.

Also, no phase delay occurs and the transmission line, which could not be extended more than a prescribed length in the past, can be extended without limitation. Therefore, external synchronization can be achieved even in the case of using a single-mode optical fiber cable where transmission over a longer distance is possible, and the scope of application of remote imaging devices (such as remote cameras) can be extended.

Fifth Embodiment

Vertical Synchronization Method

Now, a method of vertical synchronization for achieving external synchronization with an external vertical synchronizing signal will be described briefly.

Figure 10:
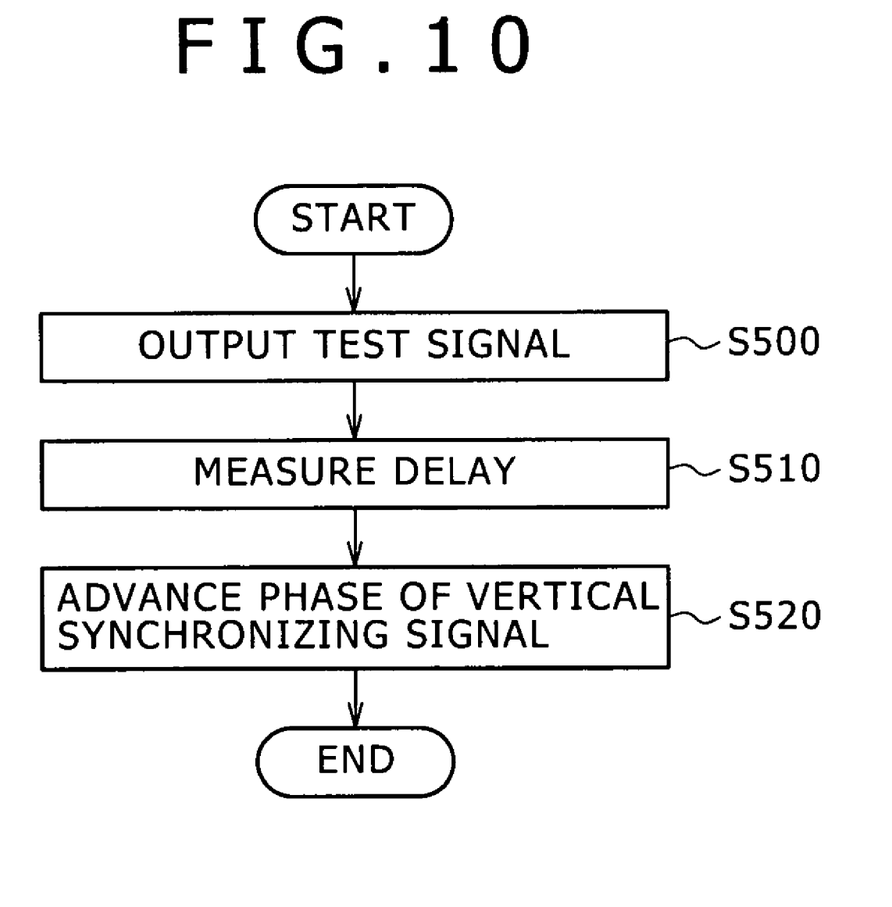
FIG. 10 is a flowchart to show how external synchronization is achieved by using an imaging controller.

FIG. 10 is a flowchart to show how external synchronization is achieved by using the above imaging controller 110.

First, the imaging controller 110 outputs a test signal to the imaging device 100 (S500). The delay between the test signal transmitted to the imaging device 100 and the test signal returned from the imaging device 100 through the transmission line is measured (S510). Then, the phase of an external vertical synchronizing signal is advanced by the delay measured by the above delay-measuring step (S510), and the external vertical synchronizing signal is outputted to the imaging device 100 (S520).

With such a vertical synchronization method, as in the imaging system described earlier, the external synchronization is achieved automatically without manual phase adjustment and, further, the transmission line between the imaging controller 110 and the imaging device 100 can be extended without limitation.

Also, a program for a computer to execute the method of vertical synchronization and a storage medium which contains such a program are provided.

Although the invention has been described in its preferred forms with accompanying drawings, it is needless to say that the invention is not limited to the specific embodiments thereof. It is to be understood that modifications will be apparent to those skilled in the art without departing from the spirit of the invention. The scope of the invention, therefore, is to be determined solely by the following claims.

In the above embodiments, for example, the measuring counter 400 measures the delay 2D, and the phase-advancing counter 430 finds the difference between the period of an external vertical synchronizing signal and the delay 2D. However, the measuring counter 400 may find the difference between the period of the external vertical synchronizing signal and the delay 2D, and the phase-advancing counter 430 may do a countdown of the result.

Also, in the above embodiments, an operating point (edge) of each signal has been described by referring to the rise and fall thereof. However, it naturally functions at the opposite edge.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging system comprising an imaging device for producing images of objects and picture signals and an imaging controller connected to the imaging device through a transmission line,
wherein the imaging device includes a vertical synchronizing signal-producing circuit to produce an internal vertical synchronizing signal for the production of images of objects;
wherein the imaging controller includes a delay-measuring circuit and a vertical-synchronization phase-advancing circuit;
wherein the imaging controller transmits a test signal to the imaging device and receives the test signal returned from the imaging device, and the delay-measuring circuit measures a delay of a phase of the returned test signal relative to a phase of the transmitted test signal;
wherein the vertical-synchronization phase-advancing circuit advances a phase of an external vertical synchronizing signal by the delay and transmits the external vertical synchronizing signal to the imaging device; and
wherein the vertical synchronizing signal-producing circuit is reset by the external vertical synchronizing signal having the advanced phase that is transmitted from the vertical-synchronization phase-advancing circuit, the vertical synchronizing signal-producing circuit generating, based on the reset, an internal vertical synchronizing signal that is synchronized with the external vertical synchronizing signal having the advanced phase that is transmitted from the vertical-synchronization phase-advancing circuit, the internal vertical synchronizing signal transmitted to the imaging controller to form a delayed internal vertical synchronizing signal such that the delayed internal vertical synchronizing signal and the external vertical synchronizing signal are synchronized without manual phase adjustment regardless of varying the imaging device and imaging controller distance.

2. The imaging system according to claim 1,
wherein the imaging device further includes a horizontal synchronizing signal-producing circuit to produce an internal horizontal synchronizing signal for the production of images of objects; and
wherein the imaging controller further includes a PLL which detects a phase difference between an external horizontal synchronizing signal and the internal horizontal synchronizing signal transmitted through the transmission line and transmits a signal to the imaging device so as to synchronize the internal horizontal synchronizing signal transmitted through the transmission line with the external horizontal synchronizing signal.

3. An imaging controller connected to an imaging device for producing images of objects and picture signals through a transmission line,
wherein the imaging controller includes a delay-measuring circuit and a vertical-synchronization phase-advancing circuit;
wherein the imaging controller transmits a test signal to the imaging device and receives the test signal returned from the imaging device, and the delay-measuring circuit measures a delay of a phase of the returned test signal relative to a phase of the transmitted test signal;
wherein the vertical-synchronization phase-advancing circuit advances a phase of an external vertical synchronizing signal by the delay and transmits the external vertical synchronizing signal to the imaging device for resetting the phase of an internal vertical synchronizing signal at the image device, the internal vertical synchronizing signal being synchronized with the external vertical synchronizing signal having the advanced phase that is transmitted from the vertical-synchronization phase-advancing circuit, the internal vertical synchronizing signal transmitted to the imaging controller to form a delayed internal vertical synchronizing signal such that the delayed internal vertical synchronizing signal and the external vertical synchronizing signal are synchronized without manual phase adjustment regardless of varying the imaging device and imaging controller distance.

4. The imaging controller according to claim 3, wherein the delay-measuring circuit is a counter.

5. The imaging controller according to claim 4, wherein the delay-measuring circuit is so set up that a counted value is set to 1 when the counted value of the delay becomes zero.

6. The imaging controller according to claim 3, wherein the vertical-synchronization phase-advancing circuit is a delaying circuit to delay the phase of the external vertical synchronizing signal by a difference between a period of the external vertical synchronizing signal and the delay.

7. The imaging controller according to claim 3, wherein the imaging controller further comprises a delay-latching circuit which latches a delay measured by the delay-measuring circuit; and wherein the delay-latching circuit latches the previously measured delay while the delay-measuring circuit does not measure the delay.

8. The imaging controller according to claim 3, wherein a signal outputted from the vertical-synchronization phase-advancing circuit resets a vertical synchronizing signal-producing circuit of the imaging device.

9. The image controller according to claim 3, wherein the test signal is the external vertical synchronizing signal.

10. The image controller according to claim 3, wherein the imaging controller further includes a PLL which detects a phase difference between an external horizontal synchronizing signal and an internal horizontal synchronizing signal produced by the imaging device and transmitted through the transmission line, and transmits a signal to the imaging device so as to synchronize the internal horizontal synchronizing signal transmitted through the transmission line with the external horizontal synchronizing signal.

11. A method for controlling an imaging controller for vertical synchronization comprising the steps of:
   transmitting a test signal from the imaging controller to an imaging device;
   measuring a delay of a phase of the test signal returned from the imaging device to the imaging controller relative to a phase of the transmitted test signal; and
   advancing a phase of an external vertical synchronizing signal by the delay and transmitting the external vertical synchronizing signal to the imaging device for resetting the phase of an internal vertical synchronizing signal at the imaging device, the internal vertical synchronizing signal being synchronized with the transmitted external vertical synchronizing signal having the advanced phase, the internal vertical synchronizing signal transmitted from the imaging device to the imaging controller to form a delayed internal vertical synchronizing signal such that the delayed internal vertical synchronizing signal and the external vertical synchronizing signal are synchronized without manual phase adjustment regardless of varying the imaging device and the imaging controller distance.

12. A non-transitory computer-readable recording medium for storing a vertical synchronization program for an imaging controller to execute, wherein the imaging controller executes the steps of:
   transmitting a test signal from the imaging controller to an imaging device;
   measuring a delay of a phase of the test signal returned from the imaging device to the imaging controller relative to a phase of the transmitted test signal; and
   advancing a phase of an external vertical synchronizing signal by the delay and transmitting the external vertical synchronizing signal to the external device for resetting the phase of an internal vertical synchronizing signal at the imaging device such that the internal vertical synchronizing signal and external vertical synchronizing signal having the advanced phase are synchronized, the internal vertical synchronizing signal being synchronized with the transmitted external vertical synchronizing signal having the advanced phase, the internal vertical synchronizing signal transmitted from the imaging device to the imaging controller to form a delayed internal vertical synchronizing signal such that the delayed internal vertical synchronizing signal and the external vertical synchronizing signal are synchronized without manual phase adjustment regardless of varying the imaging device and the imaging controller distance.

* * * * *